United States Patent [19]

Doemen

[11] Patent Number: 4,928,045
[45] Date of Patent: May 22, 1990

[54] CIRCUIT ARRANGEMENT FOR GENERATING A MEASUREMENT SIGNAL ASSOCIATED WITH THE FREQUENCY OF AN ALTERNATING CURRENT SIGNAL

[75] Inventor: Benno Doemen, St. Georgen, Fed. Rep. of Germany

[73] Assignee: Papst-Motoren GmbH & Co. KG, St. Georgen, Fed. Rep. of Germany

[21] Appl. No.: 334,539

[22] Filed: Apr. 7, 1989

Related U.S. Application Data

[63] Continuation of Ser. No. 85,566, Jul. 6, 1987, Pat. No. 4,823,060.

[30] Foreign Application Priority Data

Nov. 7, 1985 [DE] Fed. Rep. of Germany ....... 3539556

[51] Int. Cl.⁵ ............................................ G01R 23/09
[52] U.S. Cl. ..................................... 318/464; 307/519; 324/78 R; 324/166; 361/239
[58] Field of Search ................. 318/463, 464; 307/519, 307/520; 324/78 R, 78 D, 78 E, 78 F, 163, 166, 168, 173, 174; 361/239, 240, 242

[56] References Cited

U.S. PATENT DOCUMENTS

| | | | |
|---|---|---|---|
| 3,649,871 | 3/1972 | Klein et al. ...................... | 361/240 X |
| 3,848,157 | 11/1974 | Kripl .................................. | 361/239 |
| 3,870,898 | 3/1975 | Hoehn .............................. | 307/519 |
| 3,872,388 | 3/1975 | James ............................ | 307/519 X |
| 4,017,812 | 4/1977 | Bonnefoy-Claudet et al. .... | 307/520 X |
| 4,199,800 | 4/1980 | Weit .................................. | 361/239 |
| 4,370,690 | 1/1983 | Baker .............................. | 361/242 X |
| 4,400,757 | 8/1983 | Caldwell ........................ | 361/242 X |
| 4,575,677 | 3/1986 | Dennis ............................ | 361/240 X |
| 4,703,391 | 10/1987 | Franzolini ......................... | 361/240 |
| 4,839,589 | 6/1989 | Heinle ............................ | 324/166 |

Primary Examiner—Bentsu Ro
Attorney, Agent, or Firm—Spencer & Frank

[57] ABSTRACT

A circuit arrangement for generating a useful direct voltage signal associated with the frequency of an alternating current signal serves, in particular, to regulate the synchronism of an electric motor. It includes a comparator circuit (7) which converts the two opposite polarity half-waves of the alternating current signal of a tacho coil (2) into pulses whose edges trigger a measuring and control circuit (18) which generates direct voltages corresponding to the half-period durations of the alternating current signal measured from the respective zero passages. The comparison voltage input (9) of the comparator (7) is connected with the output of a differential amplifier (10) whose two inputs (29, 30) are each connected to a storage capacitor (27, 28) which can be connected, via associated first and second switches (80, 81), with the useful direct voltage signal (22), with the first switch (80) being used to periodically couple out the useful direct voltage signal associated with the first half-periods and the second switch (81) being used to periodically couple out the direct voltage signal associated with the second half-periods.

11 Claims, 3 Drawing Sheets

CIRCUIT ARRANGEMENT FOR GENERATING A MEASUREMENT SIGNAL ASSOCIATED WITH THE FREQUENCY OF AN ALTERNATING CURRENT SIGNAL

This application is a continuation of application Ser. No. 07/085,566, filed on Jul. 6, 1987, now U.S. Pat. No. 4,823,060.

BACKGROUND OF THE INVENTION

The invention relates to a circuit arrangement for generating a useful direct voltage signal associated with the frequency of an alternating current signal, particularly for regulating the synchronism of an electric motor, the arrangement including a comparator circuit which converts two opposite polarity halfwaves of the alternating current signal into pulses whose edges trigger a measuring and control circuit which is able to generate direct voltages corresponding to the half-period durations of the alternating current signal measured from the respective zero passages.

Numerous circuits are known for converting the frequency of a sinusoidal signal voltage into a direct voltage that is proportional to that frequency. Frequently, the sample-and-hold principle is employed to furnish a frequency proportional direct voltage which has a sufficiently low residual ripple. After each trigger signal, a time proportional voltage is transmitted in bursts to a storage capacitor to replace the preceding measurement value. If only the ascending or descending zero passage of the signal voltage is selected as the trigger signal, it is possible to realize high repetition accuracy but only one trigger signal is obtained per full sinusoidal oscillation. However, trigger circuits are known already which furnish a trigger signal during each zero passage before or after the conversion of the sinusoidal voltage into a rectangular voltage (frequency doubling). These circuits are useful up to a certain accuracy. If, however, one desires to perform very precise angular velocity measurements, for example, to ensure or measure synchronism of a motor, two error sources must be compensated, one being caused by the offset voltage of the comparator and the other by periodic system specific harmonics in the tachogenerator.

SUMMARY OF THE INVENTION

Based on this state of the art, it is the object of the invention to provide a circuit arrangement of the above-mentioned type which is distinguished by high measuring accuracy, with the time delay caused by the effected frequency demodulation and by the filters as well as the residual ripple in the direct voltage remaining very low.

This is accomplished, according to the invention, in that the comparison voltage input of the comparator is connected with the output of a difference switching circuit, whose two inputs are each connected to a voltage store which is connectable with the useful direct voltage signal by way of associated first and second switches, with the first switch being used to periodically couple out the useful direct voltage signal associated with the first half-periods and the second switch being used to periodically couple out the useful direct voltage signal associated with the second half-periods.

Due to the fact that the useful direct voltage signal can be coupled out via the first and second switches, each time in association with the half-periods, it is possible to effect a regulation which ensures that the detected half-periods or half waves on the average have the same length over a period of time which is long compared to the period duration. In particular, this reliably and securely compensates for drifting of the comparator offset voltage which would otherwise lead to inaccuracies in the measurements. The voltage stores may be realized in a simple manner by means of storage capacitors. In a suitable embodiment, the difference switching circuit is configured as a differential amplifier, with the regulating circuit then exhibiting PI behavior.

Other suitable embodiments and modifications of the invention are characterized in the dependent claims.

BRIEF DESCRIPTION OF THE DRAWINGS

The invention will be described in greater detail below with reference to the drawing figures, wherein.

DESCRIPTION OF THE PREFERRED EMBODIMENTS

Figure 1:
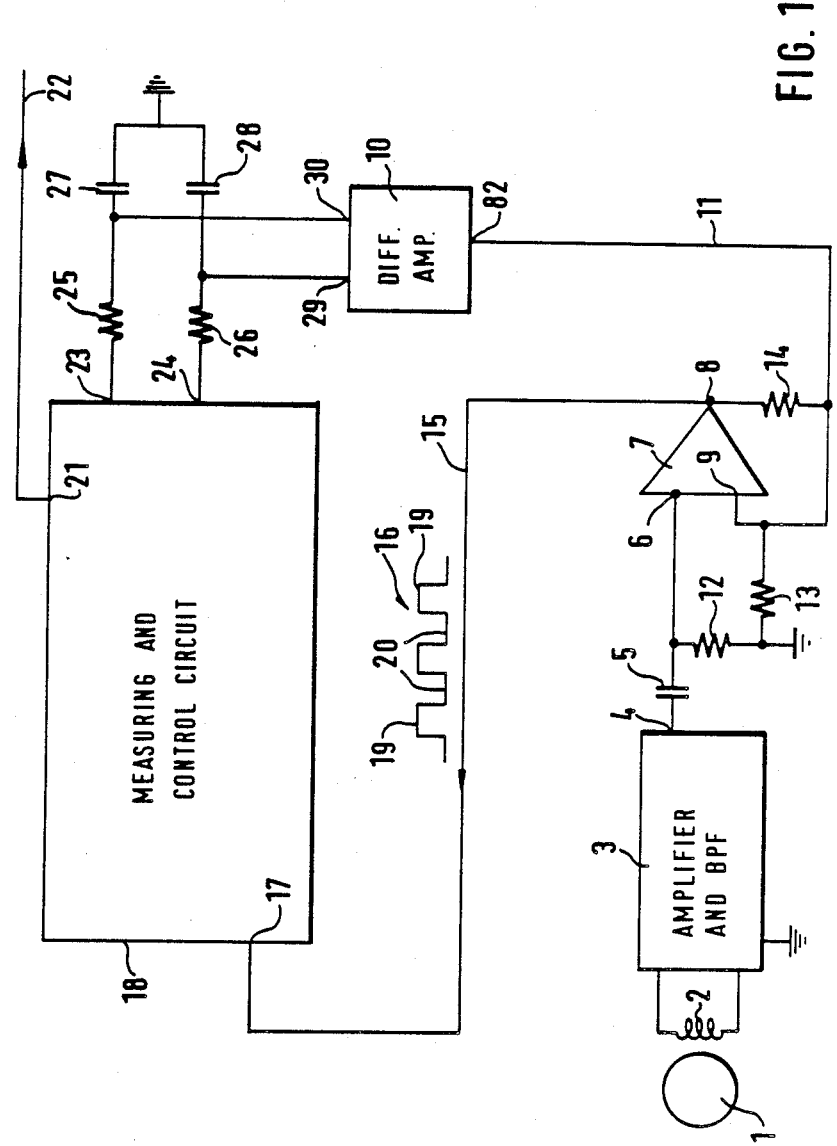
FIG. 1 is a block circuit diagram for the circuit arrangement according to the invention.

FIG. 1 shows the schematically illustrated tacho shaft 1 of an electric motor whose synchronism is to be measured. Tacho shaft 1 has an associated tacho coil 2 with which, for example, an alternating current signal at a frequency of 111 Hz is picked up. Both ends of tacho coil 2 are connected with the input of an amplifier and bandpass filter circuit 3 which amplifies the alternating current signals of tacho coil 2 and reduces superposed interference voltages which deform the symmetry of the halfwaves of the periodic alternating current signal. Output 4 of amplifier and bandpass filter circuit 3 is connected via a coupling capacitor 5 with the signal voltage input 6 of a comparator 7 at whose output 8 a logic one signal appears if, for example, the voltage at signal voltage input 6 is higher than the voltage at comparison voltage input 9. In a comparator 7 without offset voltage, a sinusoidal alternating voltage applied at the signal voltage input 6, with the comparison voltage input 9 connected to ground, would furnish a pulse-shaped signal at output 8 whose pulse/pulse pause ratio would be precisely one, i.e. the signal would alternatingly have a one state and a zero state over time periods of the same length.

To avoid errors as a result of the offset voltage of comparator 7 or due to long-time drifts and temperature drifts during the conversion of the alternating current signal into a pulse train, comparison voltage input 9 is connected via a line 11 with the output of a differential amplifier 10. As can also be seen in FIG. 1, comparator 7, which includes an operational amplifier, is additionally equipped with resistors 12, 13 and 14. Via a line 15, the originally sinusoidal tacho signal, now converted to a digital pulse train 16, reaches input 17 of a measuring and control circuit 18 which is essentially a frequency/voltage converter.

In dependence on the duration of the one-pulses 19 and the zero-pulses 20, measuring and control circuit 18 generates direct voltage signals to ensure accurate frequency/voltage conversion and thus a precise measurement of the synchronism of the motor connected with tacho shaft 1.

While a useful direct voltage signal is coupled out via a line 22 at output 21 of measuring and control circuit 18, with the voltage of this signal changing in correspondence with the changes in frequency of the alternating current signal fed in by tacho coil 2, direct voltage signals are present at outputs 23 and 24. The magnitude of these direct voltage signals is associated with the length in time of one-pulses 19 and the length in time of zero-pulses 20, respectively. Thus, with a completely symmetrical pulse train 16, the voltages at outputs 23 and 24 are identical so that storage capacitors 27, 28 connected to outputs 23, 24 via resistors 25, 26 are charged to the same voltages. If, for example, the voltage at comparison voltage input 9 of comparator 7 changes in such a manner that one-pulses 19 become longer and zero-pulses 20 become shorter, the voltage associated with the duration of one-pulses 19 and present, for example, at output 23, becomes greater while the voltage present at output 24 becomes smaller. The procedure is corresponding if the sinusoidal halfwaves at signal voltage input 6 are positive halfwaves whose half-period duration is greater than the half-period duration of the respectively subsequent negative half-waves.

While the useful direct voltage signal in line 22 should respond relatively quickly to changes in the keying ratio of pulse train 16, the regulating circuit for generating a voltage for comparison voltage input 9 of comparator 7 should be slower in time. For this reason, the values of resistors 25, 26 and storage capacitors 27, 28 have been selected in such a manner that the voltages present at inputs 29, 30 of differential amplifier 10 are averages taken over a plurality of periods of the alternating current signal at signal voltage input 6 of the comparator.

The circuit shown in FIG. 1 thus measures the duration of the positive and negative halfwaves of the alternating current signals generated by tacho coil 2, with the results present as direct voltage signals being stored separately in storage capacitors 27, 28. The slower acting regulating circuit including comparator 7, measuring and control circuit 18 and differential amplifier 10 automatically shifts the switching point of comparator 7 so that over a relatively long period of time, which is freely selectable by the dimensioning of the components, the sums of the positive and negative halfwaves put out by comparator 7 have the same length. Temporary changes are fully detected via line 22 and only a slow drifting away, for example due to changes in the temperature of the circuit of comparator 7 or changes in the temperature of the magnetic circuit of tacho coil 2, are regulated out. The circuit shown in FIG. 1 thus permits conversion of the frequency of the sinusoidal alternating current signal furnished by tacho coil 2 into a direct voltage proportional to the frequency, with measuring and control circuit 18 beginning a new time measurement with every zero passage of the sinusoidal alternating current signal. The reference line for the zero passages is formed in the control loop of the circuit of FIG. 1 according to the criterion that over a period of time which is very long compared to the period duration, the partial measuring results of the positive and negative halfwaves present at outputs 23 and 24 have the same length.

Figure 2:
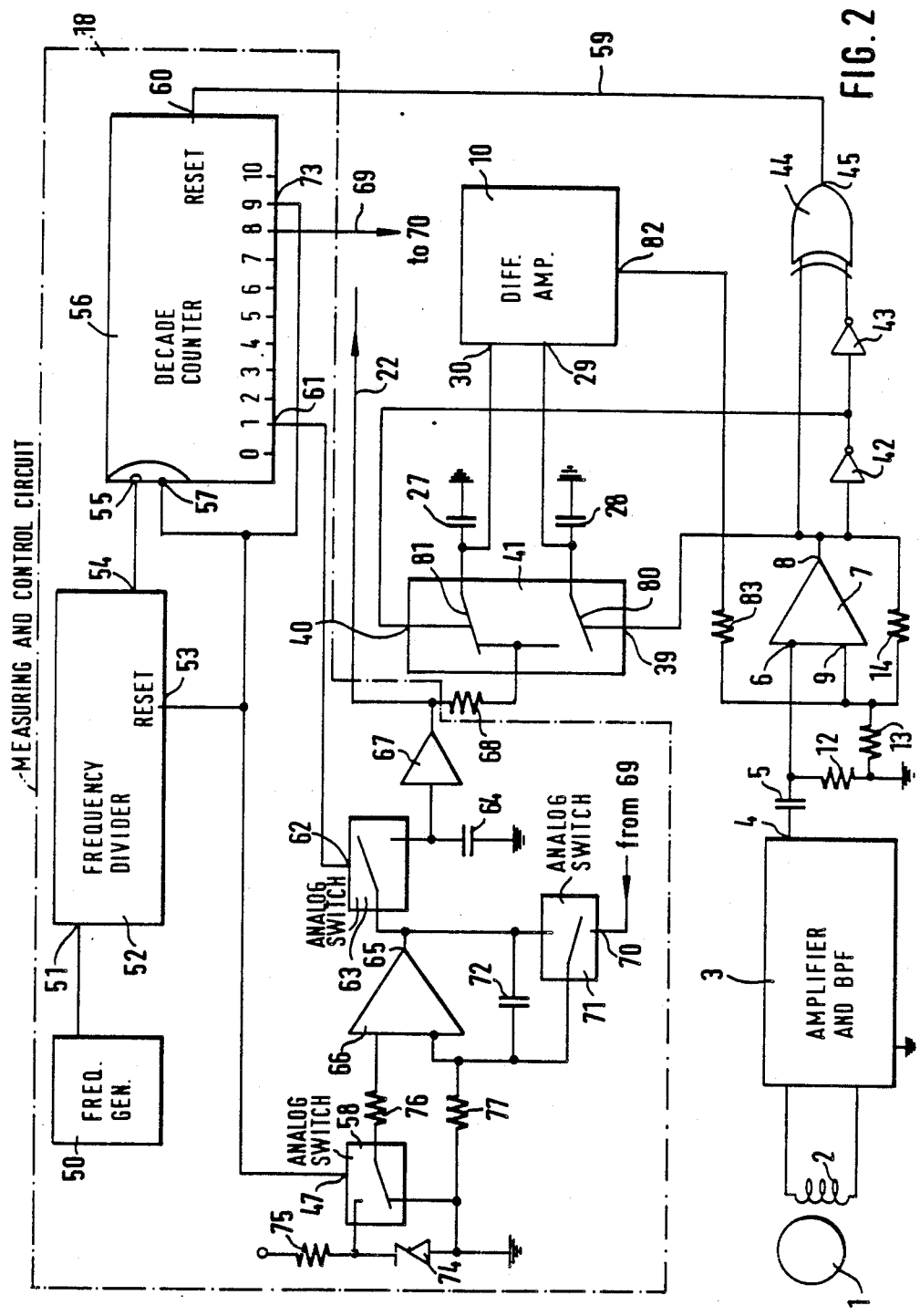
FIG. 2 is a block circuit diagram according to FIG. 1 including a detailed illustration of the measuring and control circuit for time measurement and control.

FIG. 2 shows a possible circuit for measuring and control circuit 18 together with an actuation circuit which makes it possible to feed the direct voltage components associated with the respective positive and negative half-waves separately to differential amplifier 10. Elements coinciding with those in FIG. 1 were given the same reference numerals in FIG. 2.

Output 8 of comparator 7 is connected with the first control input 39 of a CMOS analog switching circuit 41. The second control input 40 of CMOS analog switching circuit 41 is charged with a signal which is inverted compared to the first control input and is obtained at the output of a first inverter 42 whose input is likewise connected to output 8 of comparator 7. The first inverter 42 is followed by a second inverter 43. The output of the second inverter 43 is connected with one input of an Exclusive/OR gate 44. The second input of Exclusive/OR gate 44 is connected directly with output 8 of comparator 7. Due to the switching delay caused by the two inverters 42, 43, short pulses result at output 45 of Exclusive/OR gate 44 whenever comparator 7 switches over. In this way, short pulses are associated with every halfwave of the alternating current signal at signal voltage input 6 of comparator 7.

In FIG. 2, the part of the circuit framed in dash-dot lines essentially corresponds to measuring and control circuit 18 of FIG. 1. It includes a frequency generator 50 having an output frequency of, for example, 4 MHz. The output of frequency generator 50 feeds clock pulse input 51 of a frequency divider 52 which may be realized by a 12-bit counter and has a reset input 53 as well as an output 54. At a frequency of 4 MHz for frequency generator 50, a frequency of 1.953125 KHz is then present at output 54, with the clock period $T_A$ of the pulse-shaped signal being 0.512 ms.

Output 54 of frequency divider 52 is connected with the clock pulse input 55 of a decade counter 56. As can also be seen in FIG. 2, output 73 of the last stage of decade counter 56 is connected with the enabling input 57 of the counter, with the reset input 53 of frequency divider 52 and with a control input 47 of an analog switch 58.

If a pulse appears at output 45 of Exclusive/OR gate 44, the former is always brought via a line 59 to reset input 60 of decade counter 56. This sets decade counter 56 to zero. With the first positive edge appearing at clock pulse input 55 after resetting, decade counter 56 switches to counter state 1 so that a control signal appears at output 61 which is fed to the control input 62 of an analog switch 63, which may be a field effect analog switch. When analog switch 63 closes, a storage capacitor 64 is connected with the output 65 of an operational amplifier 66 connected as an integrator. The voltage present at storage capacitor 64 travels via a voltage follower 67 serving as an impedance converter to a resistor 68 which has a function corresponding to resistors 25 and 26. Additionally, the output signal of voltage follower 67 travels to line 22, which represents the output line of the circuit arrangement and carries the useful direct voltage signal.

Upon the occurrence of the second positive edge after resetting of decade counter 56, decade counter 56 switches to counter state 2 so that the control signal at output 61 disappears. Finally, decade counter 56 reaches counter state 8 and furnishes a signal via line 69 to the control input 70 of a further analog switch 71, the closing of which causes storage capacitor 72, which is part of an integrator circuit including operational amplifier 66, to be discharged.

With the next pulse at clock pulse input 55, decade counter 56 switches to counter state 9 and, due to the feedback connection of the associated output 73 with enabling input 57, blocks itself. At the same time, analog switch 58 is switched to the position not shown in the drawing so that operational amplifier 66 can become effective as a time integrator. For this purpose, a direct voltage is applied via a resistor 75 to a temperature compensated Zener diode 74 and travels via resistors 76 and 77 to the inputs of operational amplifier 66. For the angular velocities of tacho shaft 1 at the above stated frequencies, the state last described above has a duration between 0.103 ms and 0.193 ms, with an accuracy of ±1%.

During this measuring period, a measuring voltage develops at output 65, with the magnitude of this voltage depending on when the next reset pulse for decade counter 56 appears at output 45; this reset pulse coincides with the beginning of the next halfwave at signal voltage input 6 of comparator 7. After resetting of decade counter 56, the latter is able to begin counting again and, by actuation of analog switch 63, conducts the voltage value associated with the duration of the halfwave to storage capacitor 64, from whence it travels to line 22 and, depending on the position of switches 80, 81 of CMOS analog switching circuit 41, also to storage capacitor 27 or to storage capacitor 28. The circuit arrangement may be such that all useful direct voltage signals associated with the positive halfwaves charge storage capacitor 27 while all useful direct voltage signals associated with the negative halfwaves feed storage capacitor 28.

If the detected positive and negative halfwaves have the same lengths, identical voltages are present at inputs 29, 30 of differential amplifier 10 so that no further regulation takes place. If, however, due to an interference, different voltages occur at inputs 29, 30, a regulating signal is generated at output 82 of differential amplifier 10 and is conducted via a resistor 83 to comparison voltage input 9 of comparator 7 so that the position of the reference voltage defining the zero passages of the alternating voltage is changed. This follow-up regulation makes it possible for the useful direct voltage signal present at line 22 to always be a precise measure of the angular velocity of tacho shaft 1.

Figure 3:
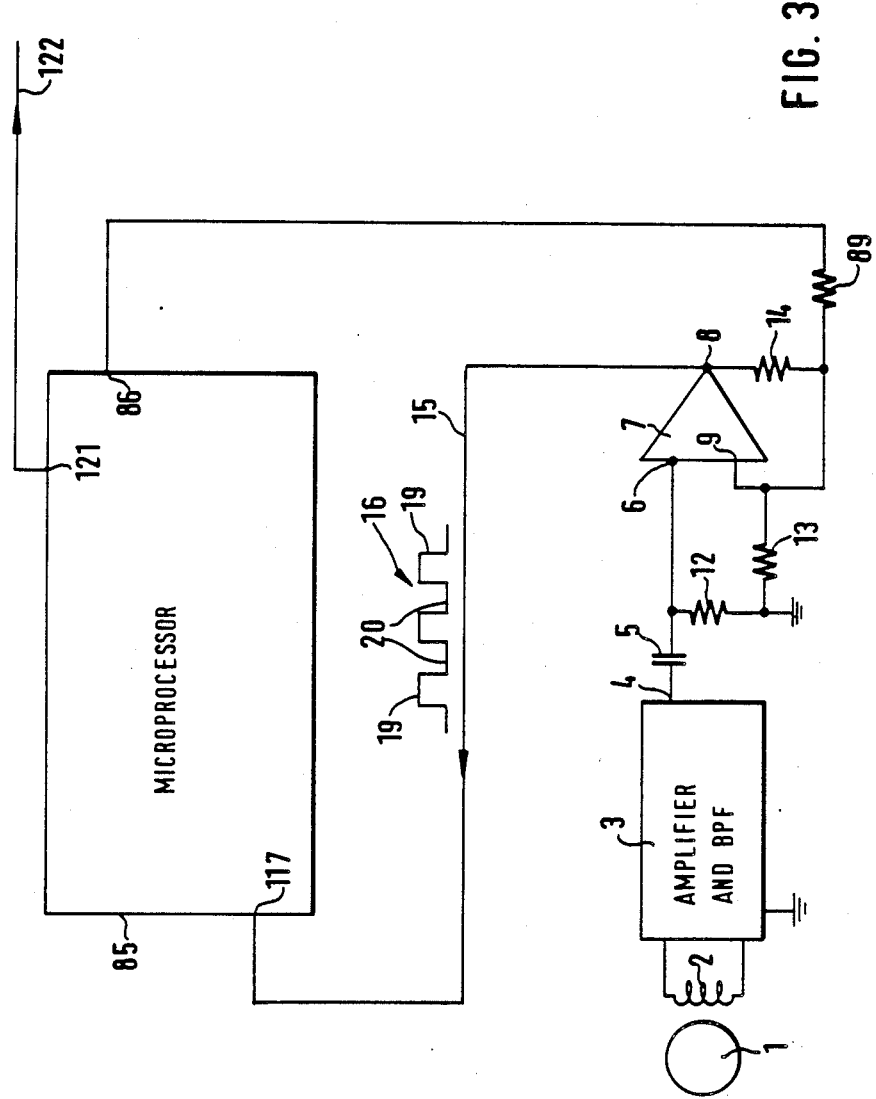
FIG. 3 is a block circuit diagram of a microprocessor controlled circuit arrangement according to the invention.

In the embodiment shown in FIG. 3, those elements which coincide with elements of the embodiments shown in FIGS. 1 and 2 are given the same reference numerals. Pulses 19, 20 derived from the rotation of tacho shaft 1 travel via line 15 to the input 117 of a microprocessor circuit 85.

The microprocessor provided in microprocessor circuit 85 includes a memory, preferably a fixed value memory, and a program which enables the microprocessor to determine the frequency of pulses 19, 20 and send from its measurement signal output 121 a measurement signal to a line 122 which may, for example, be a data bus. At regular intervals, the pulse frequency at input 117 is evaluated to generate a measurement signal. Each measurement signal may, for example, be composed of one or a plurality of 8-bit words which together represent a digital value for the measurement signal. However, microprocessor circuit 85 may also be configured in such a way that the digital output signal of the microprocessor is converted, in a digital/analog converter, into a direct voltage which is put out via line 122 to monitor, for example, the number of revolutions of a motor coupled with tacho shaft 1 or its synchronism.

However, the program stored in the memory of microprocessor circuit 85 not only determines the pulse frequency, averaged over a plurality of pulses, it also monitors whether the pulses generated by comparator 7 from the positive halfwaves and those generated from the negative halfwaves have the same length. For this purpose, the microprocessor is used to form, for example, for the duration of ten periods of the alternating current signal, a value for the average duration of the pulses associated with the positive half-waves. Correspondingly, an average duration value is determined for the duration of the pulses associated with the negative halfwaves. If the pulse lengths of these pulses 19, 20 are identical, it is not necessary to change the direct voltage signal present at the comparison voltage input 9 of comparator 7. If, however, there is a deviation between the pulse lengths associated with the positive halfwaves and those associated with the negative halfwaves, the microprocessor computes this difference and furnishes a corresponding correction signal at control signal output 86 which is fed to comparison voltage input 9.

However, the signal appearing at control signal output 86 may be a direct voltage signal having a certain sign and derived with the aid of a digital/analog converter included in microprocessor circuit 85 or the input of the digital/analog converter is connected with a data output of the microprocessor at which the respective correction signal is present, for example, as an 8-bit word.

The instructions required to set up the program in machine language depend on the configuration of the respective microprocessor provided in microprocessor circuit 85 and are known to the person skilled in the art so that a detailed description of the machine programs is not considered necessary.

What I claim is:

1. A circuit arrangement for generating measurement signals associated with the frequency of an alternating current signal, for measuring and regulating the synchronization of an electric motor, comprising:
   a measuring and control circuit; and
   a comparator circuit which converts the two opposite polarity halfwaves of the alternating current signal into pulses whose edges trigger the measuring and control circuit to generate the measurement signals in the form of digital signals or direct voltage signals, wherein the measurement signals correspond to the half-period durations of each of the two opposite polarity halfwaves of the alternating current signal measured from the respective zero passages; the measurement signals of each of the two opposite polarity halfwaves are averaged and stored separately and continuously over a plurality of periods in accordance with the positive and the negative halfwaves of the alternating current signal, and the difference of the stored values between the two opposite polarity halfwaves is fed as a correction signal to a comparison voltage input of the comparator circuit.

2. The circuit arrangement according to claim 1 further comprising two CMOS analog switches, one having a control input which is connected directly to the output of the comparator circuit, the other having a control input which is connected to the output of the comparator circuit via an inverter.

3. The circuit arrangement according to claim 1 wherein the comparison voltage input of the comparator circuit is connected to the output of an amplifier and bandpass filter circuit.

4. The circuit arrangement according to claim 3 wherein the input of the amplifier and bandpass filter circuit is connected to a tacho coil associated with a tacho shaft of the electric motor.

5. A circuit arrangement for generating direct voltage signals associated with the frequency of an alternating current signal, for regulating synchronism of an electric motor, comprising:
 a measuring and control circuit;
 a difference switching circuit having two inputs;
 voltage storing means or voltage-value storing means;
 a comparator circuit which converts the two opposite polarity halfwaves of the alternating current signal into pulses whose edges trigger the measuring and control circuit to generate said direct voltage signals corresponding to each of the two half-period durations of the alternating current signal measured from the respective zero passages, wherein a comparison voltage input of the comparator circuit is connected to the output of the difference switching circuit; each input of the difference switching circuit is connected to a voltage storing means, the two inputs of the difference switching circuit are further respectively connected to a first and a second switch, the direct voltage signals from the measuring and control circuit are fed via the first switch to periodically couple out the direct voltage signal associated with the first half-periods, and via the second switch to periodically couple out the direct voltage signal associated with the second half-periods of the alternating current signal.

6. The circuit arrangement according to claim 5 wherein the voltage storing means comprises storage capacitors.

7. The circuit arrangement according to claim 6 wherein each direct voltage signal is coupled out to the respective storage capacitor via a resistor.

8. The circuit arrangement according to claim 7 wherein the time constant of the storage capacitor and the associated resistor is a multiple of the period duration of the alternating current signal.

9. The circuit arrangement according to claim 5 wherein the difference switching circuit comprises a differential amplifier connected as a PI controller.

10. A circuit arrangement for generating measurement signals associated with the frequency of an alternating current signal, for detecting the number of revolutions and for regulating the synchronism of an electric motor, comprising:
 a measuring and control circuit;
 a microprocessor circuit;
 a comparator circuit which converts the two opposite polarity halfwaves of the alternating current signal into pulses whose edges trigger the measuring and control circuit to generate said measurement signals corresponding to the half-period durations of the alternating current signal measured from the respective zero passages, wherein a comparison voltage input of the comparator circuit is connected via a smoothing circuit to a control signal output of the microprocessor circuit whose input is connected to a pulse furnishing output of the comparator circuit, said microprocessor circuit providing at its measurement signal output a measurement signal associated with the number of revolutions and at its control signal output a correction signal whose magnitude is a measure of the difference, averaged over a plurality of pulses, between the duration of the pulses associated with the positive halfwaves and the duration of the pulses associated with the negative halfwaves of the alternating current signal.

11. The circuit arrangement according to claim 10 wherein the control signal output of the microprocessor circuit is the output of a digital/analog converter included in the microprocessor circuit.

* * * * *